United States Patent
Kim

(10) Patent No.: US 9,515,537 B2
(45) Date of Patent: Dec. 6, 2016

(54) MOTOR HAVING A SENSOR MAGNET AND A STRUCTURE TO MOUNT THE SAME

(71) Applicant: LG INNOTEK CO., LTD., Seoul (KR)

(72) Inventor: Goon Chul Kim, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 94 days.

(21) Appl. No.: 13/998,517

(22) Filed: Nov. 7, 2013

(65) Prior Publication Data

US 2014/0125207 A1 May 8, 2014

(30) Foreign Application Priority Data

Nov. 8, 2012 (KR) .................. 10-2012-0126307

(51) Int. Cl.
  *H02K 23/66* (2006.01)
  *H02K 21/12* (2006.01)
  *G01R 33/00* (2006.01)
  *G01D 5/00* (2006.01)
  *H02K 11/00* (2016.01)
  *H02K 29/08* (2006.01)

(52) U.S. Cl.
  CPC ........... *H02K 11/0021* (2013.01); *H02K 29/08* (2013.01)

(58) Field of Classification Search
  CPC ...................... H02K 11/00; H02K 29/00
  USPC .......... 310/68 B, 156.11; 324/207.2, 207.25
  See application file for complete search history.

(56) References Cited

U.S. PATENT DOCUMENTS 4,392,375 A * 7/1983 Eguchi et al. ............ 73/114.36
2008/0218160 A1 * 9/2008 Tsuchida et al. ......... 324/207.25

FOREIGN PATENT DOCUMENTS

| DE | 102009037500 A1 * | 2/2011 |
| JP | 2009189093 A * | 8/2009 |
| JP | 2012005260 A * | 1/2012 |
| KR | 20100086758 A2 * | 8/2010 |

* cited by examiner

Primary Examiner — Jose Gonzalez Quinones
(74) Attorney, Agent, or Firm — Ked & Associates, LLP

(57) ABSTRACT

A motor includes a rotation shaft having a first recessed portion. The first recess portion includes a bottom surface and a wall surface and a second recessed portion formed in the bottom surface. A rotor having a first magnet surrounds the rotation shaft and rotates together with the rotation shaft. A detector includes a second magnet mounted in the first recessed portion and detects rotation of the rotor.

9 Claims, 5 Drawing Sheets

MOTOR HAVING A SENSOR MAGNET AND A STRUCTURE TO MOUNT THE SAME

CROSS-REFERENCE TO RELATED APPLICATION

This application claims priority to and the benefit of Korean Patent Application No. 2012-0126307, filed on Nov. 8, 2012, the disclosure of which is incorporated herein by reference in its entirety.

BACKGROUND

1. Field

The present disclosure relates to a motor, and more particularly, to an assembling structure of a motor.

2. Background

FIG. 1 illustrates an example of a motor.

Referring to FIG. 1, a motor 1 includes a rotation shaft 10, a rotor 11 that surrounds the rotation shaft 10, and a detector 12 that detects a rotation angle of the rotor 11. The rotor 11 includes a rotor core 111 that surrounds the rotation shaft 10 and a drive magnet 112 coupled to the rotor core 111. The rotor 11 rotates together with the rotation shaft 10 by interaction with a stator (not shown) fixed to a housing (not shown).

The detector 12 detects a position of the rotor 11, i.e., a position of the drive magnet 112. To this end, the detector 12 may include a sensor magnet 121 and an encoder integrated chip (IC) 122. The sensor magnet 121 emits flux or polarity according to rotation of the rotation shaft 10 and the rotor 11, and the encoder IC 122 detects the flux or polarity emitted by the sensor magnet 121, thereby detecting rotation of the rotor 11.

To this end, the sensor magnet 121 may be mounted in a recessed portion formed in one end of the rotation shaft 10. An assembling structure of the sensor magnet 121 and the rotation shaft 10 will be described with reference to FIG. 2, which is an enlarged view of a portion A of FIG. 1.

Referring to FIG. 2, an edge A' of the sensor magnet 121 has a round shape. Thus, an assembling portion of the rotation shaft 10 that contacts the edge A' of the sensor magnet 121 also has a round shape.

As the usage period of the motor 1 increase, the assembling portion of the rotation shaft 10 on which the sensor magnet 121 is mounted, may be worn out. If the assembling portion of the rotation shaft 10 is worn out, a gap may be formed between the sensor magnet 121 and the rotation shaft 10. Thus, the sensor magnet 121 cannot be solidly fixed to the rotation shaft 10, and magnetism of the sensor magnet 121 leaks such that a degree of precision of detection may be lowered.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
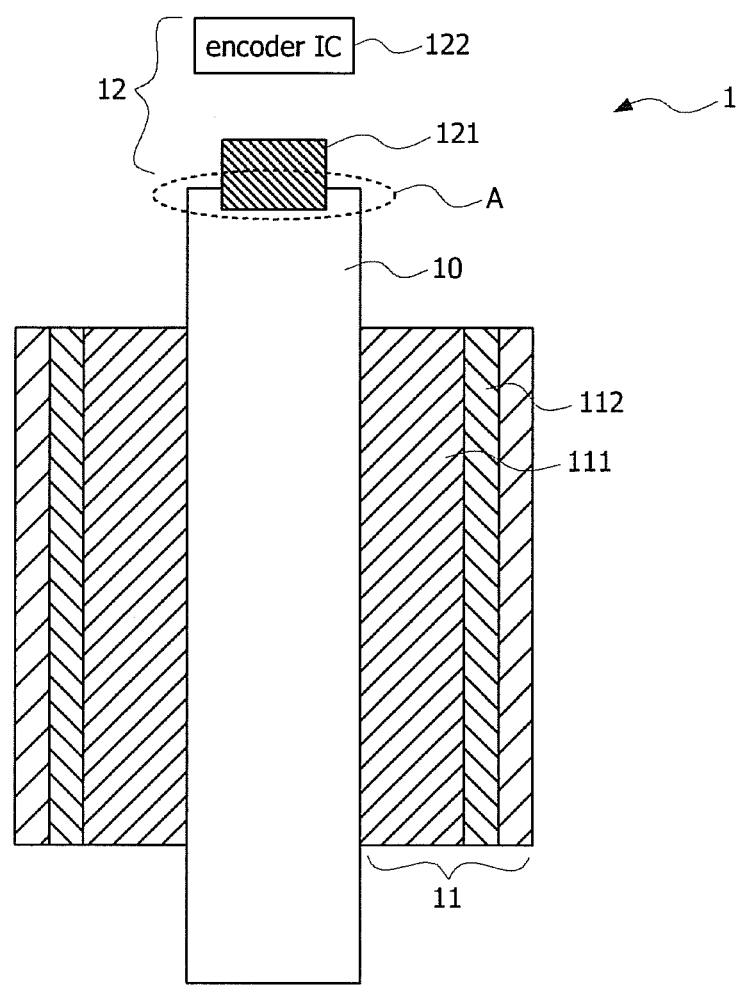
FIG. 1 illustrates an example of a motor.

As the disclosure allows for various changes and numerous embodiments, particular embodiments will be illustrated in the drawings and described in detail in the written description. However, this is not intended to limit the present disclosure to particular modes of practice, but it is to be appreciated that all changes, equivalents, and substitutes that do not depart from the spirit and technical scope of the present disclosure are encompassed in the present disclosure.

While such terms as "first," "second," etc., may be used to describe various components, such components must not be limited to the above terms. The above terms are used only to distinguish one component from another. For example, a second component may be referred to as a first component within the scope of the present disclosure, and similarly, the first component may be referred to as the second component. As used herein, the term "and/or" includes any and all combinations of one or more of the associated listed items.

It will be understood that when an element is, referred to as being "on," "connected to," or "coupled to" another element, it may be directly on, connected, or coupled to the other element or intervening elements may be present. In contrast, when an element is referred to as being "directly on," "directly connected to," or "directly coupled to" another element, there are no intervening elements present.

The terms used in the present specification are merely used to describe particular embodiments, and are not intended to limit the present disclosure. An expression used in the singular encompasses the expression of the plural, unless it has a clearly different meaning in the context. In the present specification, it is to be understood that the terms such as "including" or "having," etc., are intended to indicate the existence of the features, numbers, steps, operations, components, parts, or combinations thereof disclosed in the specification, and are not intended to preclude the possibility that one or more other features, numbers, steps, operations, components, parts, or combinations thereof may exist or may be added.

Unless otherwise defined, all terms (including technical and scientific terms) used herein have the same meaning as commonly understood by one of ordinary skill in the art to which exemplary embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present disclosure will now be described more fully with reference to the accompanying drawings, in which exemplary embodiments of the disclosure are shown. Those components that are the same or are in correspondence are rendered the same reference numeral regardless of the figure number, and redundant explanations are omitted.

Figure 3:
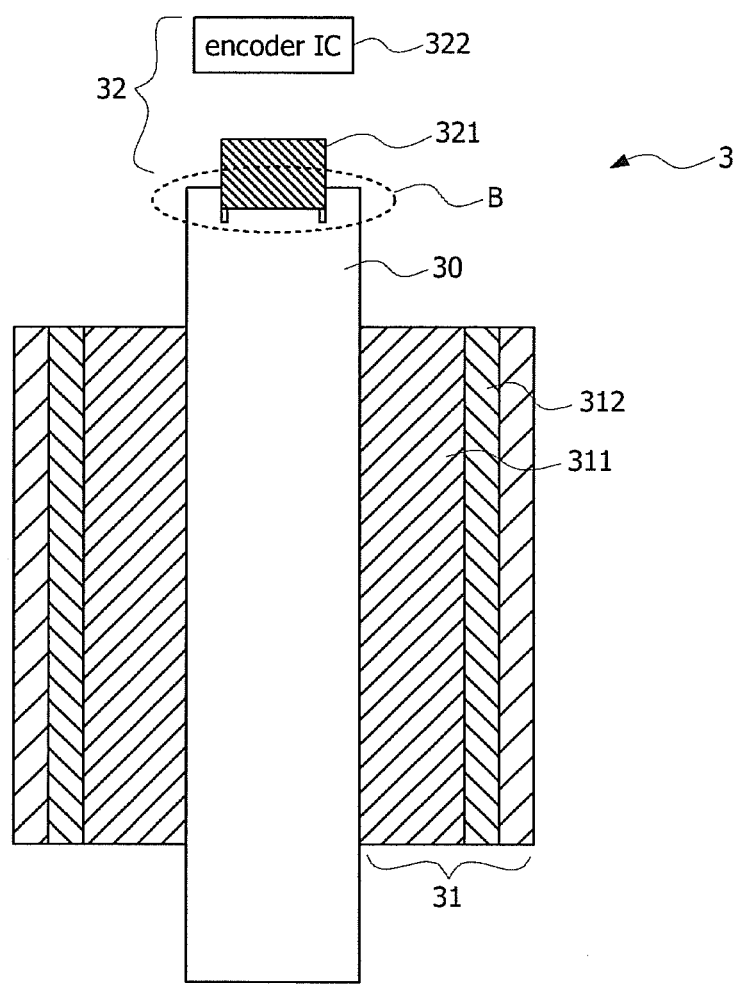
FIG. 3 illustrates a motor according to an embodiment of the present disclosure.

FIG. 3 illustrates a motor according to an embodiment of the present disclosure.

Referring to FIG. 3, a motor 3 includes a rotation shaft 30, a rotor 31 that surrounds the rotation shaft 30, and a detector 32 that detects a position of the rotor 31. The rotation shaft 30 is supported by a housing (not shown). The rotor 31 includes a rotor core 311 that surrounds the rotation shaft 30 and a drive magnet 312 coupled to the rotor core 311. The rotor core 311 has a cylindrical shape, and the drive magnet 312 is formed on an outer circumferential surface of the rotor core 311. At least one drive magnet 312 may be formed at the rotor core 311.

Meanwhile, a stator (not shown) including a plurality of coils is fixed to an inside of the housing (not shown). A predetermined gap is formed between the rotor 31 and the stator (not shown), and the rotor 31 rotates together with the rotation shaft 30 due to interaction with the stator.

The detector 32 detects a rotation angle and a rotation speed of the rotor 31 and a position of the drive magnet 312. To this end, the detector 32 may include a sensor magnet 321 and an encoder integrated chip (IC) 322. The sensor magnet 321 emits flux or polarity according to rotation of the rotation shaft 30 and the rotor 31. The encoder IC 322 detects the flux or polarity emitted by the sensor magnet 321, thereby detecting the rotation angle or the rotation speed of the rotor 31. Alternatively the encoder IC 322 may be substituted with a Hall IC.

The sensor magnet 321 is fixed to one end of the rotation shaft 30 so as to emit flux or polarity according to rotation of the rotation shaft 30 and the rotor 31.

According to an embodiment of the present disclosure, a notch is formed at a portion where the rotation shaft 30 and an edge of the sensor magnet 321 contact each other.

Figure 4:
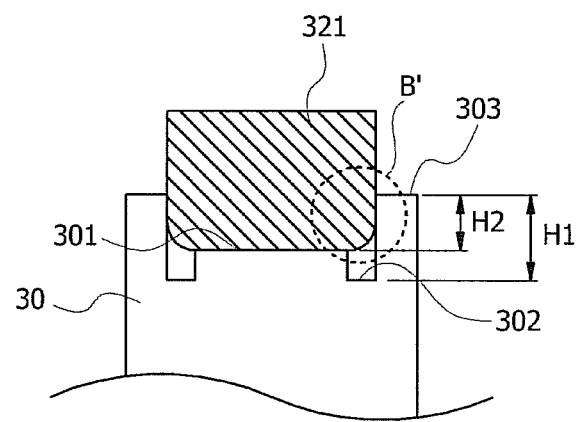
FIG. 4 is a cross-sectional view of an assembling portion of a rotation shaft and a sensor magnet, according to an embodiment of the present disclosure.
Figure 5:
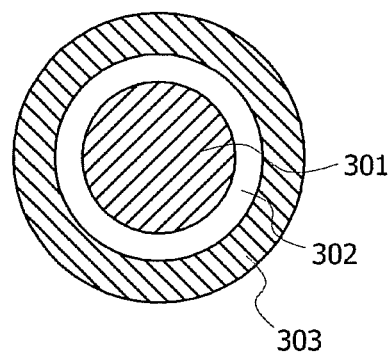
FIG. 5 illustrates an example of a top view of one end of the rotation shaft on which the sensor magnet is mounted.

FIG. 4 is a cross-sectional view of an assembling portion of the rotation shaft and the sensor magnet of the motor illustrated in FIG. 3; and FIG. 5 illustrates an example of a top view of one end of the rotation shaft on which the sensor magnet is mounted.

Referring to FIGS. 4 and 5, a recessed portion 301 is formed in one end 303 of the rotation shaft 30 so that the sensor magnet 321 can be mounted in the recessed portion 301. The recessed portion 301 includes a bottom surface and a wall surface. A height of the bottom surface of the recessed portion 301 is lower than a height of the one end 303 of the rotation shaft 30. The recessed portion 301 may be formed in a cylindrical shape.

At least one notch 302 is formed on the bottom surface of the recessed portion 301. The notch 302 means an uneven portion formed in a part of the bottom surface of the recessed portion 301 and may be mixedly used with a recessed portion or a furrow. The notch 302 may have an unevenness shape, a V-shape, or a round shape, for example. The notch 302 may be formed at a portion where the rotation shaft 30 and an edge B' of the sensor magnet 321 contact each other, i.e., along a border between the bottom surface and the wall surface of the recessed portion 301 or along a region in which the bottom surface of the recessed portion 301 and the edge B' of the sensor magnet 321 contact each other.

Thus, an area in which the rotation shaft 30 and the edge B' of the sensor magnet 321 contact each other, can be reduced. Thus, wear-out of a region corresponding to a round shape of the edge B' of the sensor magnet 321 of the bottom surface of the recessed portion 301 formed in the rotation shaft 30 can be reduced. Also, a leakage of magnetism that occurs due to contact with the rotation shaft 30, can be reduced. Thus, a degree of precision of detection can be improved.

Figure 2:
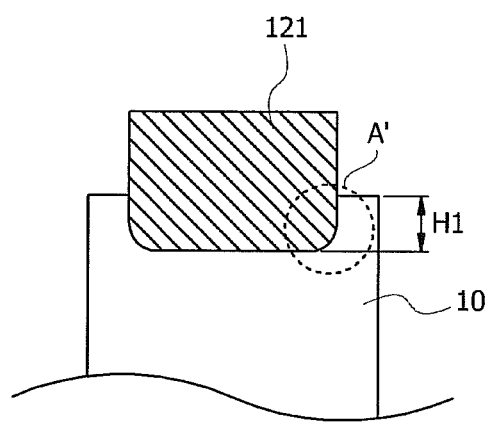
FIG. 2 is an enlarged view of an assembling structure of a sensor magnet and a rotation shaft of the motor illustrated in FIG. 1.

In addition, the height of the wall surface of the recessed portion 301 needs to be maintained at a predetermined height H1 or higher so as to form a portion in which the rotation shaft 10 and the edge A' of the sensor magnet 121 contact each other, in a round shape, as illustrated in FIG. 2. However, if one end of the rotation shaft 30 is formed according to an embodiment of the present disclosure, the wall surface of the recessed portion 301 may have a height H2 that is reduced by removing the round shape from the height H1. Thus, a height of the sensor magnet 321 and a height of the rotation shaft 30 can be reduced so that material costs can be reduced.

Figure 6:
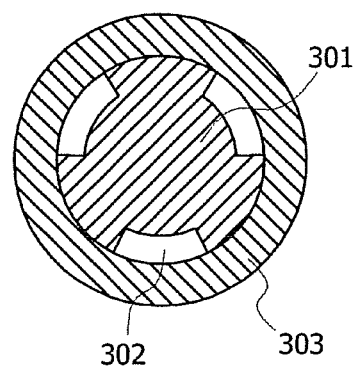
FIG. 6 illustrates another example of a top view of one end of the rotation shaft on which the sensor magnet is mounted.

Meanwhile, the notch 302 may also be discontinuously formed along a circumference of the recessed portion 301, i.e., along a border between the bottom surface and the wall surface of the recessed portion 301. FIG. 6 illustrates another example of a top view of one end of the rotation shaft on which the sensor magnet is mounted.

Referring to FIG. 6, the notch 302 may also be discontinuously formed at a portion where the rotation shaft 30 and the edge B' of the sensor magnet 321 contact each other, i.e., along the border between the bottom surface and the wall surface of the recessed portion 301.

The motor according to an embodiment of the present disclosure may be a brushless direct current (BLDC) motor. The BLDC motor means a DC motor in which an electronic rectifier except a mechanical contact portion, such as a brush or a commutator, is installed.

The motor according to an embodiment of the present disclosure may be applied to a dual clutch transmission (DCT) motor, for example. However, embodiments of the present disclosure are not limited thereto.

As described above, according to the one or more embodiments of the present disclosure, wear-out of a region in which a sensor magnet is mounted, is reduced so that durability of a rotation shaft of a motor can be improved and a degree of precision of detection can be improved.

In addition, an area in which the sensor magnet and the rotation shaft contact each other, is reduced so that the amount of leaking magnetism can be reduced.

Furthermore, a height of the sensor magnet and a height of the rotation shaft are reduced so that material costs can be reduced.

It will be apparent to those skilled in the art that various modifications can be made to the above-described exemplary embodiments of the present disclosure without departing from the spirit or scope of the disclosure. Thus, it is intended that the present disclosure covers all such modifications provided they come within the scope of the appended claims and their equivalents.

The present disclosure is directed to an assembling structure of a motor that detects rotation of a rotor.

According to an aspect of the present disclosure, there is provided a motor including: a rotation shaft including a first recessed portion including a bottom surface and a wall surface and a second recessed portion formed in the bottom surface of the first recessed portion; a rotor that surrounds the rotation shaft, rotates together with the rotation shaft, and includes a first magnet; and a detector that includes a second magnet mounted in the first recessed portion and detects rotation of the rotor.

The second recessed portion may be formed along a border between the bottom surface and the wall surface of the first recessed portion.

The second recessed portion may be discontinuously formed.

The second recessed portion may be formed in a region in which an edge of the second magnet and the bottom surface of the first recessed portion contact each other.

The second magnet may be a sensor magnet for detecting rotation of the rotor.

The detector may further include an encoder integrated chip (IC) that detects at least one selected from the group consisting of a rotation angle of the rotor, a rotation speed of the rotor, and a position of the first magnet according to flux or polarity emitted from the second magnet.

According to another aspect of the present disclosure, there is provided a dual clutch transmission (DCT) including a motor, wherein the motor includes: a rotation shaft including a first recessed portion formed in one end of the rotation shaft and including a bottom surface and a wall surface and a second recessed portion formed in the bottom surface of the first recessed portion; a rotor that surrounds the rotation shaft, rotates together with the rotation shaft, and includes at least one first magnet; and a detector that includes a second magnet mounted in the first recessed portion and detects rotation of the rotor.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A motor comprising:
   a rotation shaft comprising a first recessed portion formed in one end of the rotation shaft and including a bottom surface and a wall surface and a second recessed portion formed in the bottom surface of the first recessed portion;
   a rotor that surrounds the rotation shaft, rotates together with the rotation shaft, and comprises a first magnet; and
   a detector that comprises a second magnet mounted in the first recessed portion and detects rotation of the rotor,
   wherein the second recessed portion is formed along a border between the bottom surface and the wall surface of the first recessed portion.

2. The motor of claim 1, wherein the second recessed portion is discontinuously formed.

3. The motor of claim 1, wherein the second magnet is a sensor magnet for detecting rotation of the rotor.

4. The motor of claim 1, wherein the detector further comprises an encoder integrated chip (IC) that detects at least one selected from the group consisting of a rotation angle of the rotor, a rotation speed of the rotor, and a position of the first magnet according to flux or polarity emitted from the second magnet.

5. A motor comprising:
   a rotation shaft comprising a first recessed portion formed in one end of the rotation shaft and including a bottom surface and a wall surface and a second recessed portion formed in the bottom surface of the first recessed portion;
   a rotor that surrounds the rotation shaft, rotates together with the rotation shaft, and comprises a first magnet; and
   a detector that comprises a second magnet mounted in the first recessed portion and detects rotation of the rotor,
   wherein the second recessed portion is formed in a region in which an edge of the second magnet and the bottom surface of the first recessed portion contact each other.

6. The motor of claim 5, wherein the second magnet is a sensor magnet for detecting rotation of the rotor.

7. The motor of claim 5, wherein the detector further comprises an encoder integrated chip (IC) that detects at least one selected from the group consisting of a rotation angle of the rotor, a rotation speed of the rotor, and a position of the first magnet according to flux or polarity emitted from the second magnet.

8. A dual clutch transmission (DCT) comprising a motor, wherein the motor comprises:
   a rotation shaft comprising a first recessed portion formed in one end of the rotation shaft and including a bottom surface and a wall surface and a second recessed portion formed in the bottom surface of the first recessed portion;
   a rotor that surrounds the rotation shaft, rotates together with the rotation shaft, and comprises at least one first magnet; and
   a detector that comprises a second magnet mounted in the first recessed portion and detects rotation of the rotor,
   wherein the second recessed portion is formed along a border between the bottom surface and the wall surface of the first recessed portion.

9. A dual clutch transmission (DCT) comprising a motor, wherein the motor comprises:
   a rotation shaft comprising a first recessed portion formed in one end of the rotation shaft and including a bottom surface and a wall surface and a second recessed portion formed in the bottom surface of the first recessed portion;
   a rotor that surrounds the rotation shaft, rotates together with the rotation shaft, and comprises at least one first magnet; and
   a detector that comprises a second magnet mounted in the first recessed portion and detects rotation of the rotor,
   wherein the second recessed portion is formed in a region in which an edge of the second magnet and the bottom surface of the first recessed portion contact each other.

* * * * *